United States Patent

Pickron

[15] 3,666,322

[45] May 30, 1972

[54] MOLDED PLASTIC WHEEL STRUCTURE

[72] Inventor: Roger R. Pickron, Roseau, Minn.

[73] Assignee: Textron Inc., Providence, R.I.

[22] Filed: May 6, 1970

[21] Appl. No.: 35,031

[52] U.S. Cl. ...................... 301/63 PW, 74/230.01, 74/243 R
[51] Int. Cl. ............................................................. B60b 5/02
[58] Field of Search .................... 152/323, 327, 328, 379; 74/230.01, 230.7; 16/45; 301/63 PW, 63 DD

[56] References Cited

UNITED STATES PATENTS

| | | | |
|---|---|---|---|
| 3,309,150 | 3/1967 | Marier | 301/63 DD |
| 3,158,404 | 11/1964 | Noakes | 301/63 PW |
| 1,288,949 | 12/1918 | Malloy | 152/379 X |
| 2,768,862 | 10/1956 | Christensen | 301/63 DD |
| 2,448,248 | 8/1948 | Bennett | 152/323 |

FOREIGN PATENTS OR APPLICATIONS 647,141  12/1950  Great Britain ........................ 152/379

Primary Examiner—Richard J. Johnson
Attorney—Merchant & Gould

[57] ABSTRACT

Molded wheel structure having a relatively hard rigid body and a relatively softer resilient annular member, the body including a tubular hub and a pair of axially spaced annular disk portions projecting radially from the hub and having smooth generally flat axially outer surfaces, the annular member including a rim radially outwardly of the disk portions and wall means between the disk portions.

6 Claims, 4 Drawing Figures

PATENTED MAY 30 1972  3,666,322

INVENTOR.
ROGER R. PICKRON
BY
Merchant & Gould
ATTORNEYS 3,666,322

MOLDED PLASTIC WHEEL STRUCTURE

BACKGROUND OF THE INVENTION

This invention relates to wheels intended primarily for use on vehicles such as snowmobiles, where light weight and extreme strength is desired. Such wheels are in the nature of sprocket wheels and bogie wheels for driving and supporting the vehicle in combination with an endless drive belt or track. Wheels of metal and synthetic plastics have been used and have been found to be either overweight or, if of lighter weight, lacking in sufficient strength to withstand the extreme side thrusts and shock loads to which they are subjected. Attempts have been made to strengthen light-weight wheels by using spoke-like ribs on exterior wheel disk surfaces. While such ribs are effective to add strength, snow accumulates between the ribs, adding weight thereto and lessening the efficiency thereof.

SUMMARY OF THE INVENTION

The wheel of this invention comprises a shell-like body of relatively hard and rigid molded thermo-plastic resin, and an annular member of relatively softer and resilient molded thermo-plastic resin. The body is formed to provide an axial tubular hub and a pair of axially spaced annular disk portions projecting radially outwardly from the hub portion and having generally flat axially outer annular surfaces. The disk portions are connected by circumferentially spaced radial ribs, and at their outer peripheries are formed to provide generally axially outwardly projecting annular flanges. The resilient annular member comprises an outer rim portion securely adhered to the annular flanges, and radially inner wall means in the nature of generally segmentally shaped wall portions projecting radially inwardly from the rim portion and disposed between the body disk portions and ribs and rigidly secured thereto. The wall portions engage the body hub portion, whereby radial loads imparted to the rim portion are transferred directly to the hub portion.

DETAILED DESCRIPTION

Figure 1:
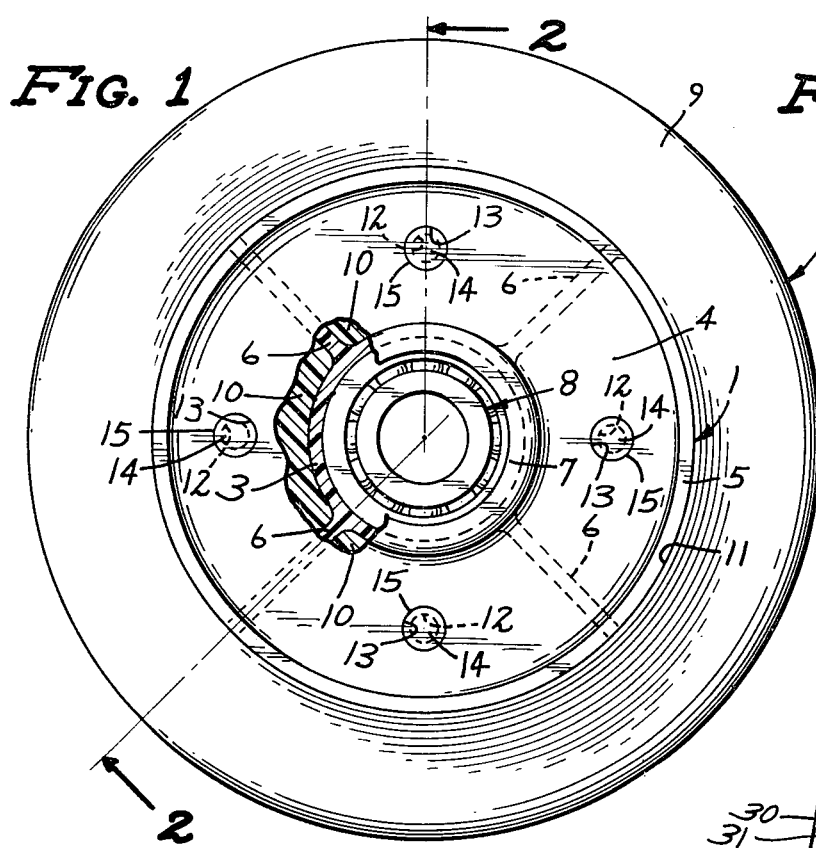
FIG. 1 is a view in side elevation of a wheel structure produced in accordance with this invention, some parts being broken away and some parts being shown in section.
Figure 2:
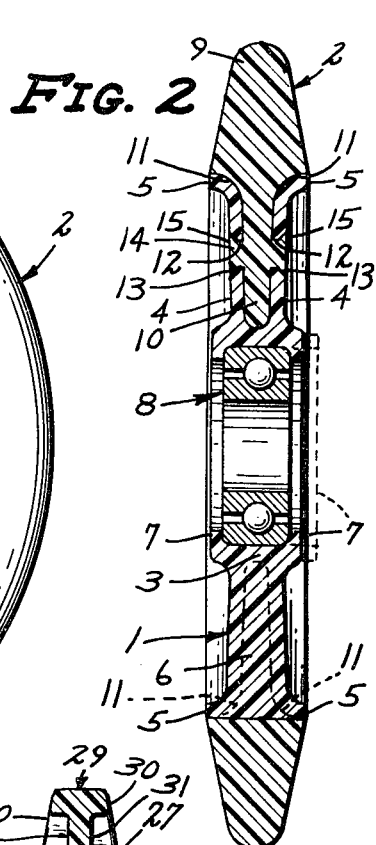
FIG. 2 is a transverse section taken on the line 2—2 of FIG. 1.

In the embodiment of the invention illustrated in FIGS. 1 and 2, a wheel is shown as comprising a shell-like body 1 and an annular member 2. This wheel is in the nature of a bogie wheel commonly used in the suspension means for snowmobiles, in cooperation with an endless drive belt or track used for driving a snowmobile. The body 1 is molded from suitable thermo-plastic resin, and is relatively hard and rigid, the body 1 being formed to provide a tubular hub portion 3, a pair of axially spaced annular disk portions 4 projecting generally radially outwardly from the hub portion 3, and a pair of annular flanges 5 each projecting generally axially outwardly of a different one of the disk portions 4 at the outer periphery thereof. The disk portions 4 are connected by a plurality of internal ribs 6 that extend radially outwardly from the hub portion 3 to the outer periphery of the body 1. The hub portion 3 includes a pair of inturned annular lips or flanges 7 which confine therebetween the outer race of an anti-friction bearing, such as a conventional ball-bearing 8. As shown by broken lines in FIG. 2, the body 1 is initially formed with but one inturned lip or flange 7, the other thereof projecting axially outwardly from the hub portion 3. The ball-bearing 8 is inserted into the hub portion 3 at the final assembly of the wheel, after which the opposite flange 7 is turned or molded radially inwardly by heating and forming the same after it has been softened by heating.

The annular member 2 comprises an annular rim portion 9 disposed radially outwardly of the flanges 5 of the disk portions 4, and radially inner wall means comprising a plurality of generally segmentally shaped wall portions 10 integrally formed with the rim portion 9 and projecting radially inwardly therefrom to the hub portion 3 between the ribs 6 and disk portions 4. Preferably, the annular member 2 is molded of thermo-plastic resin, and is relatively softer and more resilient than the body 1. The body 1 is preferably utilized as a portion of a mold for producing the annular member 2, the member 2 being heat-sealed or bonded to the body 1. As shown particularly in FIG. 2, the rim portion 9 defines generally radially inwardly facing annular shoulders 11 that become bonded to their respective flanges 5 during molding of the member 2 in the body 1. Also, as shown, the radially inner wall portions 10 extend radially inwardly between the disk portions 4 to the hub portion 3, completely filling the cavities formed by the disk portions 4 and ribs 6. Thus, radial loads applied to the rim portion 9 are transferred by the wall portions 10 directly to the hub 3 and bearing 8.

It will be noted that the disk portions 4 have smooth substantially flat axially outer surfaces between the hub portion 3 and flanges 5 and, intermediate the internal ribs 6, are provided with circumferentially spaced openings 12 extending in a direction axially through the disk portions 4. As shown in FIG. 2, the openings 12 have axially outer ends that are countersunk or otherwise radially enlarged, as indicated at 13. The openings 12 are filled with the material from which the annular member 2 is formed, to provide transverse bosses 14 having axially outer ends 15 that are enlarged to fit the enlarged or countersunk portions 13, the extreme outer ends of the bosses 14 being flat and coplanar with the axially outer surfaces of the disk portions 4. The headed bosses 14 assist materially in holding the disk portions 4 against spreading apart intermediate the internal ribs 6 under heavy side thrust or axial loading of the wheel during operation thereof. Further, by having the outer surfaces of the disk portions 4 flat and smooth, and by having the enlarged or head portions 15 of the bosses 14 smooth and coplanar with the outer surfaces of the disk portions 4, accumulation of snow or other material on the outer surfaces of the wheel body is avoided even when the vehicle on which the wheel is mounted is driven through soft deep snow. It will be noted that the outer surfaces of the annular portion 9 are also smooth to prevent snow from adhering thereto during rotation thereof.

Figure 3:
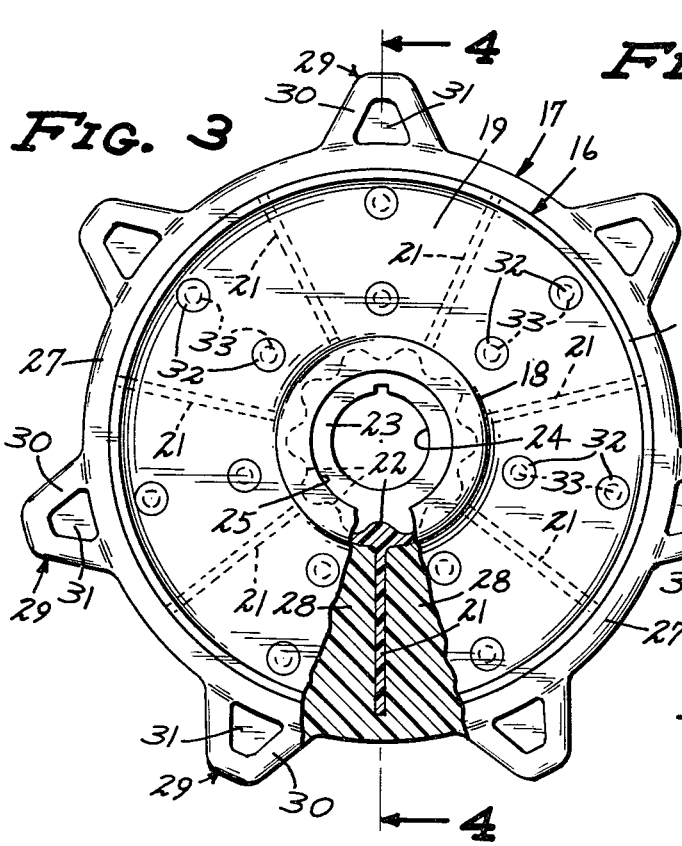
FIg. 3 is a view corresponding to FIG. 1 but showing a modified form of wheel.
Figure 4:
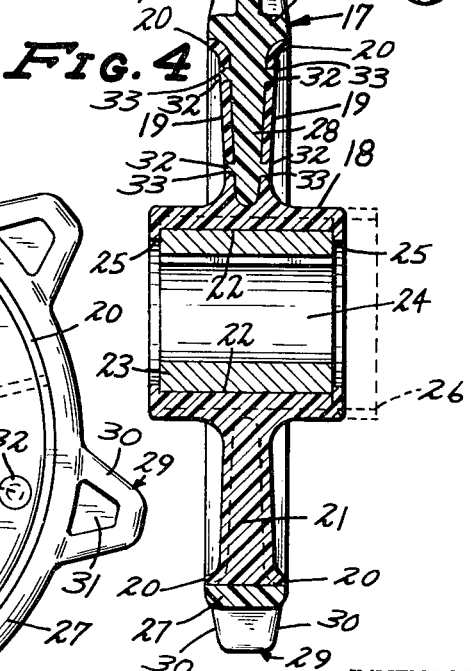
FIG. 4 is a transverse section taken on the line 4—4 of FIG. 3.

The modified form of wheel illustrated in FIGS. 3 and 4 comprises a shell-like body 16 and an annular member 17, the body 16 including a tubular hub portion 18, a pair of axially spaced annular disk portions 19 projecting radially outwardly from the hub portion 18, and a pair of annular flanges 20 projecting generally axially outwardly from the outer periphery of each disk portion 19. The body 16 is further formed to provide a plurality of internal ribs 21 that extend radially outwardly from the hub portion 18 to the flanges 20, the ribs 21 being integrally formed with the disk portions 19.

The hub portion 18 is internally toothed, as indicated at 22, to have meshing engagement with an externally toothed central bushing 23 having a keyed axial opening 24 whereby the wheel of FIGS. 3 and 4 may be mounted on a shaft, not shown. The bushing 23 is held against axial movement in the hub portion 18 by a pair of inturned flanges 25 at opposite ends of the hub portion 18, each of the inturned flanges 25 engaging an adjacent end of the bushing 23, as shown in FIG. 4. Like the body 1, the body 16 is formed from thermo-plastic resin, one of the inturned flanges 25 being initially formed as an extended portion of the tubular hub 18, as shown by dotted lines in FIG. 4 and indicated at 26. When the bushing 23, which is preferably of metal, is inserted into the hub portion 18, the portion 26 is formed as shown by full lines in FIG. 4, by application of heat and forming pressure in the usual manner of forming thermo-plastic material.

The annular member 17 comprises a rim portion 27 that encircles the flanges 20, inner wall means including a plurality of circumferentially spaced generally segmentally shaped wall portions 28 that are integrally formed with the rim portion 27 and which project radially inwardly between the internal ribs 21 to the hub portion 18. The rim portion 27 is formed to provide a plurality of circumferentially spaced sprocket teeth 29 having radially outwardly tapering sides 30 and axially outwardly opening recesses 31 in the sides 30. As shown in FIG. 4, the rim portion 27 and radially inner portions of the teeth 29 have an axial dimension substantially equal to that of the flanges 20.

The annular member 17 is made of material similar to the annular member 2, the wall portions 28 having axially projecting headed bosses 32 that are disposed in countersunk openings 33 in the same manner that the bosses 14 are anchored in the openings 12 of the wheel of FIGS. 1 and 2. The axially outer end of the bosses 32 are likewise coplanar with the smooth substantially flat outer surfaces of the disk portions 19.

The wheel illustrated in FIGS. 3 and 4 is primarily intended for use as a drive or idler sprocket wheel in connection with an endless flexible drive track or belt commonly used in propelling snowmobiles. The bushing 23 adapts the sprocket wheel of FIGS. 3 and 4 to a drive shaft, not shown, and is used to impart driving movement to a snowmobile drive belt or track, also not shown. It will be appreciated that the hub portion 18 may be axially shortened and adapted to receive a ball-bearing such as the bearing 8, so as to be used as an idler sprocket wheel.

While a preferred embodiment of the wheel structure of this invention, as well as one modification thereof has been disclosed, it will be understood that the same is capable of further modification, without departure from the spirit and scope of the invention, as defined in the claims.

What is claimed is:

1. A wheel comprising:
 a. a molded shell-like body including, a tubular hub portion, a pair of axially spaced annular disk portions projecting radially outwardly from the hub portion, said disk portions having smooth substantially flat axially outer surfaces, and a plurality of circumferentially spaced reinforcing ribs integrally formed with said hub and disk portions and connecting said disk portions, said ribs extending radially from said hub portion toward the outer periphery of said disk portions;
 b. and an annular member secured to said body and including radially inner wall means disposed between said disk portions, and an annular rim portion disposed radially outwardly of said disk portions, said wall means extending radially inwardly from said rim portion to said hub portion whereby to transfer radial loads from the rim portion directly to said hub portion.

2. The wheel according to claim 1 in which said wall means comprises a plurality of generally segmentally shaped wall portions projecting radially inwardly from said rim portion to said hub portion between said ribs, said wall portions being adhered to said disk portions, hub portion and said ribs.

3. The wheel according to claim 2 in which said body includes a pair of annular flanges each projecting generally axially outwardly of a different one of said disk portions at the radially outer periphery thereof, said rim portion defining a pair of generally radially inwardly facing circumferential shoulders adhered to said flanges.

4. The wheel according to claim 2 in which said body and annular member are molded from thermo-plastic resins, said body being relatively hard and rigid, said annular member being relatively softer and resilient.

5. The wheel according to claim 1 in which said disk portions each have a plurality of circumferentially spaced openings extending in a direction axially therethrough, said openings having enlarged axially outer ends, said wall means including a plurality of transverse bosses each disposed in a different one of said openings and each having an enlarged axially outer end filling the enlarged portion of its respective opening, said axially outer end of each of said bosses being coplanar with said outer surface of its respective annular disk portion.

6. The wheel according to claim 3 in which said disk portions each have a plurality of circumferentially spaced openings extending in a direction axially therethrough, said openings having enlarged axially outer ends, said wall portions including a plurality of transverse bosses each disposed in a different one of said openings and each having an enlarged axially outer end portion fitting the enlarged portion of its respective opening.

* * * * *